(12) United States Patent
Worner et al.

(10) Patent No.: US 6,854,649 B2
(45) Date of Patent: Feb. 15, 2005

(54) OPTOELECTRONIC DEVICE

(75) Inventors: Jörg Worner, Weilheim/Tech (DE);
Jörg Droemer, Bad Urach-Wittlingen (DE)

(73) Assignee: Leuze Electronic GmbH & Co., Owen/Tech (DE)

( * ) Notice: Subject to any disclaimer, the term of this patent is extended or adjusted under 35 U.S.C. 154(b) by 229 days.

(21) Appl. No.: 09/987,236

(22) Filed: Nov. 13, 2001

(65) Prior Publication Data

US 2002/0070415 A1 Jun. 13, 2002

(30) Foreign Application Priority Data

Nov. 13, 2000 (DE) ......................................... 100 56 232

(51) Int. Cl.⁷ .............................................. G06K 7/10
(52) U.S. Cl. ............. 235/454; 235/462.01; 235/462.05; 235/462.39
(58) Field of Search ........................... 235/454, 462.01, 235/462.05, 462.39

(56) References Cited

U.S. PATENT DOCUMENTS

| | | | | |
|---|---|---|---|---|
| 4,983,817 A | * | 1/1991 | Dolash et al. | 235/462.04 |
| 5,525,798 A | | 6/1996 | Berson et al. | |
| 5,701,001 A | * | 12/1997 | Sugifune et al. | 235/462.42 |
| 6,045,045 A | * | 4/2000 | Detwiler | 235/114 |
| 6,049,406 A | * | 4/2000 | Zocca | 359/196 |
| 6,193,157 B1 | * | 2/2001 | Dickson et al. | 235/462.01 |
| 6,273,337 B1 | * | 8/2001 | Detwiler et al. | 235/462.32 |
| 6,294,776 B2 | * | 9/2001 | Miksch et al. | 250/208.1 |
| 6,311,894 B1 | * | 11/2001 | Miyajima et al. | 235/462.36 |
| 6,460,770 B1 | * | 10/2002 | Kucharczyk | 235/472.02 |
| 2001/0042787 A1 | * | 11/2001 | Yomogida et al. | 235/462.01 |

FOREIGN PATENT DOCUMENTS

| | | |
|---|---|---|
| DE | 43 37 718 | 4/1995 |
| DE | 198 42 352 | 3/2000 |
| DE | 199 20 311 A1 | 11/2000 |
| WO | 95/19605 A1 | 7/1995 |

OTHER PUBLICATIONS

Daoqi Yu, Miklos Stern and Joseph Katz, Speckle Noise in Laser Bar–Code–Scanner Systems, Applied Optics, vol. 35, No. 1, Jul. 1, 1996, pp. 3687–3694.

Strichcodeleser BCL 21/22 mit integriertem Decoder und Anschlusseinheit MA2', Technische Beschreibung, 1998, Leuze Electronic GmbH + Co., Owen Teck, pp. 1–4, 10–13, 39.

\* cited by examiner

*Primary Examiner*—Thien M. Le
*Assistant Examiner*—Allyson N. Trail
(74) *Attorney, Agent, or Firm*—Venable LLP; Catherine M. Voorhees

(57) ABSTRACT

An optoelectronic device for detecting marks having defined contrast patterns includes a transmitter for emitting transmitted light beams having a wavelength $\lambda$ in a range of 350 nm $\leq \lambda \leq$ 450 nm. A transmission lens is located downstream of the transmitter. A receiver is provided for receiving received light beams and generating reception signals corresponding to the received light beams. A receiving lens is located upstream of the receiver and has an area $A_C$ of less than or equal to 5 cm². A guiding mechanism guides the transmitted light beams at the marks and the reflected light beams from the marks as received light beams to the receiver. An evaluation unit is coupled to an output of the receiver for evaluating the reception signals.

9 Claims, 1 Drawing Sheet

OPTOELECTRONIC DEVICE

CROSS-REFERENCE TO RELATED APPLICATION

Priority is claimed herein with respect to Application Ser. No. 100 56 232.9 filed in Germany on Nov. 13, 2000, the disclosure of which is incorporated herein by reference.

FIELD OF THE INVENTION

The invention relates to an optoelectronic device for detecting marks that are provided with defined contrast patterns, having a transmitter emitting transmitted light beams, a transmission lens downstream of the transmitter, a receiver that receives received light beams, a receiving lens upstream of the receiver, and an evaluation unit. The transmitted light beams are guided via the marks where they are reflected and then guided as received light beams to the receiver. Reception signals generated at the output of the receiver are evaluated in the evaluation unit in order to detect the marks.

BACKGROUND OF THE INVENTION

One such device is known from German Patent DE 43 37 718 C1, which is used to detect marks that have contrast patterns, and in particular to detect bar codes.

The transmitted light beams emitted by a transmitter are guided across the marks. The received light beams reflected from the marks have an amplitude modulation corresponding to the contrast pattern of the applicable mark.

The reception signals present at the output of the receiver because of the received light beams are evaluated in an evaluation unit, which has an n-bit analog/digital converter and an arrangement of digital filters. The analog/digital converter, which preferably has a word width of 8 bits, converts the analog reception signal into a digitized reception signal. This digitized reception signal is delivered to the arrangement of digital filters. The coefficients of the digital filters are selected such that the digital filtration compensates for signal distortions in the reception signal that are caused by component tolerances of the components used in the optoelectronic device.

The detection sensitivity of the optoelectronic device can be enhanced as a result.

From German Patent Disclosure DE 198 42 352, a further optoelectronic device for detecting marks, especially bar codes, is known. In this device, a transmitter is used that emits transmitted light beams in the blue wavelength range.

In comparison to optoelectronic devices that use transmitters that emit transmitted light beams in the red or infrared wavelength range, in this device, with increasing distance, a slower widening of the beam diameter of the transmitted light beams takes place. As a consequence, the transmitted light beams, even at relatively great distances from the device, still have such a small beam diameter that secure detection of the marks is assured.

Thus by the use of such transmitters, a great depth of field, within which marks are detectable, is obtained.

SUMMARY OF THE INVENTION

An object of the invention is to furnish an optoelectronic device of the type defined at the outset which with the smallest possible size has the highest possible detection sensitivity.

The above and other objects are achieved according to the invention by the provision of an optoelectronic device for detecting marks having defined contrast patterns, comprising: a transmitter for emitting transmitted light beams having a wavelength $\lambda$ in a range of 350 nm $\leq \lambda \leq$ 450 nm; a transmission lens downstream of the transmitter; a receiver for receiving received light beams and generating reception signals corresponding to the received light beams; a receiving lens located upstream of the receiver and having an area $A_C$ of less than or equal to 5 cm$^2$; means for guiding the transmitted light beams at the marks and for guiding reflected light beams from the marks as received light beams to the receiver; and an evaluation unit coupled to an output of the receiver for evaluating the reception signals.

With an optoelectronic device embodied in this way, the advantages of high detection sensitivity and small structural size can be combined.

The invention is based on the recognition that the limits of detection of optoelectronic devices used industrially to detect marks, especially at great distances of the marks from the device, are determined by the speckle noise.

The speckle noise is caused by the fact that the marks themselves, or the substrates onto which the marks are printed, have a certain surface roughness.

The transmitted light beams striking such a surface, and especially a paper surface, are diffusely reflected from it.

Because of the irregular, rough surface structure, optical interference occurs in the transmitted light beams that are reflected from the marks and guided to the receiver in the form of received light beams. Thus in the reception plane of the receiver, so-called speckles appear in the form of spot-like interference patterns.

When a mark is scanned by the optoelectronic device, the transmitted light beams are guided across the mark. Since the roughness structure of the surface on which the mark is applied is not distributed homogeneously but rather statistically, the speckled pattern on the receiver varies during the scanning. This variation over time of the speckled pattern on the receiver causes the speckle noise.

The signal-to-noise ratio SNR that is obtained because of the speckle noise is proportional to the quotient of the area of the receiving lens $A_C$ and the mean area $<A>$ of the speckle:

$$SNR \sim A_C / <A>$$

The mean area $<A>$ of the speckle in turn depends on the distance d of the mark from the wavelength $<R>$ of the roughness of the surface, in accordance with the following relationship:

$$<A> \sim d^2 \cdot \lambda^2 / <R>^2$$

The result is the following dependency for the signal-to-noise ratio:

$$SNR \sim A_C / <A> \sim A_C <R>^2 / (d \cdot \lambda)^2$$

According to the invention, the speckle noise is minimized in the optoelectronic device by the provision that instead of transmitters that conventionally emit in the red or infrared wavelength range, a transmitter is used that emits transmitted light beams in the ultraviolet and/or blue wavelength range. According to the invention, a transmitter is used that emits transmitted light beams having a wavelength $\lambda$ in the range of 350 nm $\leq \lambda \leq$ 450 nm.

The transmitters typically used in industrial applications emit at a wavelength of about 660 nm. If that kind of transmitter is replaced by a transmitter that emits transmitted light beams at about 400 nm, then the signal-to-noise ratio is improved by a factor of approximately 2.7.

According to the invention, the use of a transmitter that emits in the ultraviolet or blue wavelength range is combined with a receiving lens whose area is less than or equal to 5 cm$^2$.

The use of such a small receiving lens makes a considerable reduction in the structural size of the optoelectronic device of the invention possible, compared to known devices of this type.

This is due to the fact that the size of the receiving lens essentially determines the entire structural size of the optoelectronic device. This is especially true whenever the optoelectronic device has a deflection unit, which in particular has a rotating polygonal mirror wheel.

By means of the polygonal mirror wheel, the transmitted light beams are periodically guided to inside a scanning range. The received light beams reflected from the marks are guided via the polygonal mirror wheel to the receiver.

In order for the received light beams to be guided all the way from the polygonal mirror wheel to the receiver, the sizes of the mirror faces are adapted to the area of the receiving lens across which the received light beams are guided to the receiver.

Thus the smaller the receiving lens can possibly be made, then the smaller the polygonal mirror wheel can be. Because of its relatively large volume, the size of the polygonal mirror wheel definitively determines the size of the entire device, so that by reducing the area of the receiving lens, the entire structural size of the optoelectronic device can be reduced.

The smaller area of the receiving lens is compensated for, or overcompensated for, by the use according to the invention of the transmitter that emits in the ultraviolet and/or blue wavelength range, so that compared to conventional optoelectronic devices, which use transmitters that emit in the red or infrared wavelength range, a considerable reduction in structural size is obtained, for the same or even improved detection sensitivity.

The invention will be described below in conjunction with the drawing.

DESCRIPTION OF THE PREFERRED EMBODIMENT

Figure 1:
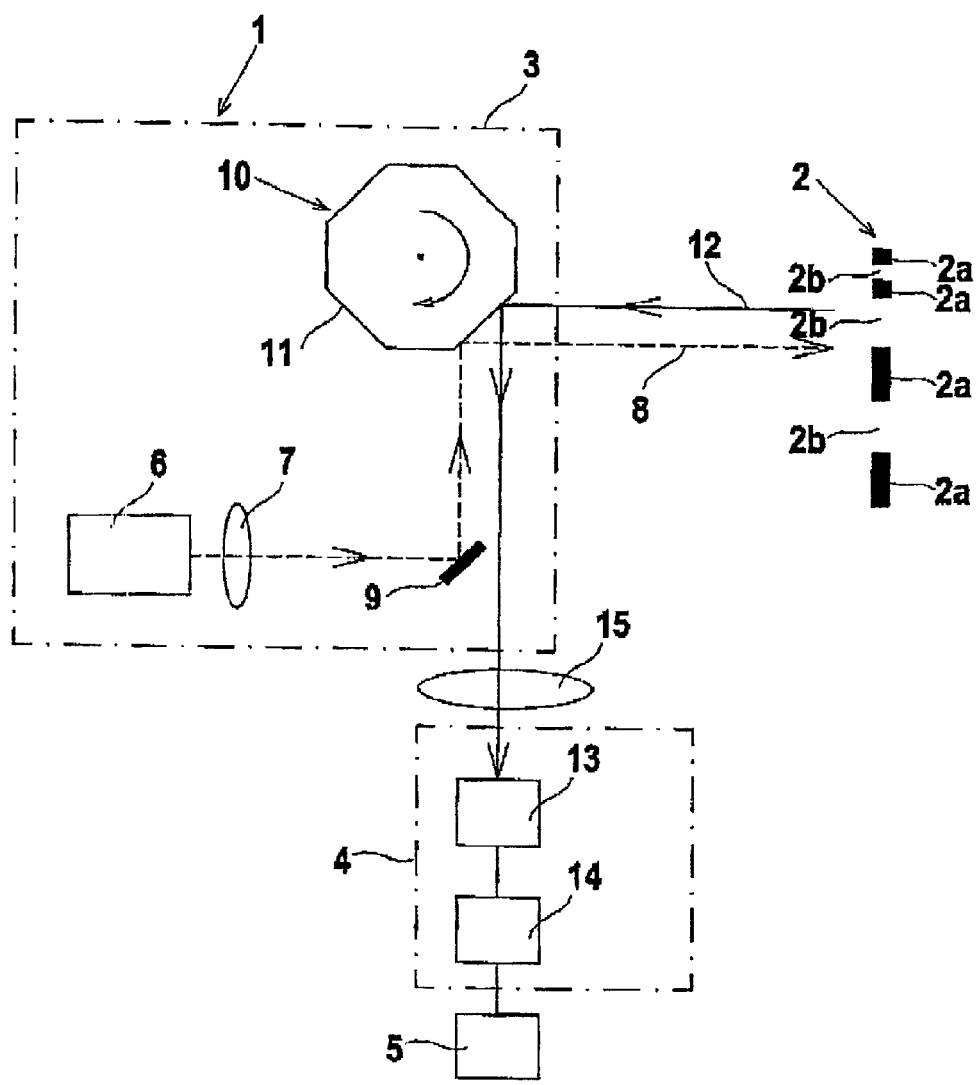
FIG. 1, the sole drawing figure, is a schematic illustration, in partial block circuit diagram form, of one exemplary embodiment of the optoelectronic device of the invention.

In FIG. 1, the fundamental layout of one exemplary embodiment of the optoelectronic device 1 of the invention for detecting marks that are provided with defined contrast patterns is shown. In principle, the marks can have arbitrary successions and forms of bright and dark areas adjacent one another, preferably black and white areas. The invention will be explained below for the case where the marks are formed by bar codes 2. The bar codes 2 substantially comprise an alternating succession of light and dark, preferably black and white, line elements 2a, 2b. Each of the line elements 2a, 2b has the same length. In accordance with the information encoded in the bar code 2, the individual line elements 2a, 2b have certain module widths B.

The optoelectronic device 1 substantially comprises a transmission element 3, a reception element 4, and an evaluation unit 5. The transmission element 3 comprises a transmitter 6 as well as a transmission lens 7, downstream of the transmitter 6, for focusing the transmitted light beams 8 emitted by the transmitter 6. The focused transmitted light beams 8 are guided via a deflecting mirror 9 to a deflection unit, which in the present exemplary embodiment is formed by a motor-driven, rotating polygonal mirror wheel 10. The polygonal mirror wheel 10 has a plurality of identical mirror faces 11, at which the transmitted light beams 8 are deflected. The axis of rotation of the polygonal mirror wheel 10 is located perpendicular to the equatorial plane, shown in FIG. 1, of the polygonal mirror wheel 10.

By the rotary motion, the transmitted light beams 8 are periodically guided to inside a scanning range. The scanning range extends in one plane and across an angular range that is defined by the number of mirror faces 11 of the polygonal mirror wheel 10.

Bar codes 2 located inside the scanning range are periodically scanned with the transmitted light beams 8. The bar codes 2 can be detected within a certain distance range from the optoelectronic device 1, the so-called depth of field.

The received light beams 12 reflected from the bar code 2 are guided to the reception element 4 via the polygonal mirror wheel 10. The received light beams 12 are guided across the same mirror face 11 of the polygonal mirror wheel 10 as the transmitted light beams 8.

The reception element 4 comprises a photodiode 13, in which the received light beams 12 are converted into an analog electronic reception signal, and an amplifier 14 downstream of the photodiode. To improve the detection sensitivity, a receiving lens 15 precedes the reception element 4.

The reception signals present at the output of the reception element 4 are delivered to the evaluation unit 5, which by way of example is embodied as a microcontroller.

In the evaluation unit 5, the analog reception signals are converted, for instance by means of a threshold value unit, into a binary signal train. For detecting a bar code 2, this signal train is compared with a signal train corresponding to the contrast pattern of the bar code 2 and stored in memory in the evaluation unit 5.

In principle, the transmitter 6 can be formed by a light emitting diode. In an especially advantageous embodiment of the invention, the transmitter 6 is formed by a laser diode.

According to the invention, the transmitter 6 emits transmitted light beams 8 having wavelengths in the range of 350 nm$\leq\lambda\leq$450 nm. Thus the transmitter 6 emits transmitted light beams 8 in the visible blue and/or the near-ultraviolet range. In the present exemplary embodiment, a laser diode, which emits transmitted light beams 8 at a central wavelength of 405 nm, is used as the transmitter 6.

The beam diameter of the transmitted light beams 8, especially inside the depth of field, amounts to a maximum of 660 μm.

With the optoelectronic device 1, bar codes 2 that are disposed at a distance d of up to 1.5 m from the device can be detected. The module widths B of the line elements 2a, 2b are preferably within a range of 0.1$\leq$B$\leq$0.4 mm.

The area $A_C$ of the receiving lens 15 is a maximum of 5 cm$^2$. The receiving lens 15 preferably has a circular cross section.

The areas of the mirror faces 11 of the polygonal mirror wheel 10 are adapted to the area of the receiving lens 15. Preferably, the areas of the mirror faces 11 of the polygonal mirror wheel 10 are slightly smaller than the area of the receiving lens 15. In each case, it is assured that at least virtually the entire quantity of light of the received light beams 12 is guided to the receiver via the mirror faces 11 and via the receiving lens 15.

Thus the size of the receiving lens 15 determines the size of the mirror faces 11 of the polygonal mirror wheel 10 and thus determines the size of the entire polygonal mirror wheel 10. Since the polygonal mirror wheel 10, because of its relatively large volume, substantially determines the size of the housing, not shown, with which the optoelectronic device 1 is integrated, it is possible by means of the small dimensioning, provided according to the invention, of the area of the receiving lens 15 to reduce the entire structural size of the optoelectronic device 1 considerably.

The reduction in the area of the receiving lens 15 does not lead to any impairment in the detection sensitivity of the optoelectronic device 1, since a transmitter 6 that emits in the ultraviolet and/or blue wavelength range is used. In particular, compared to conventional devices that function with transmitters 6 that emit in the visible range, a signal-to-noise ratio relative to the speckle noise is obtained that is at least as high or preferably even higher. At the long reading distances attainable with the device of the invention, in the range up to d=1.5 m, this speckle noise forms the dominant noise component.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An optoelectronic device for detecting marks having defined contrast patterns, comprising:
   a transmitter for emitting transmitted light beams having a wavelength $\lambda$ in a range of 350 nm $\leq \lambda \leq$ 450 nm;
   a transmission lens downstream of the transmitter;
   a receiver for receiving received light beams and generating reception signals corresponding to the received light beams;
   a receiving lens located upstream of the receiver and having an area $A_C$ of less than or equal to 5 cm$^2$;
   means for guiding the transmitted light beams at the marks and for guiding reflected light beams from the marks as received light beams to the receiver; and
   an evaluation unit coupled to an output of the receiver for evaluating the reception signals.

2. The optoelectronic device of claim 1, wherein the marks comprise bar codes including an alternating succession of light and dark line elements with module widths B in a range of $$0.1 \text{ mm} \leq B \leq 0.4 \text{ mm}.$$

3. A method of detecting marks up to a distance d of d=1.5 m, comprising utilizing the optoelectronic device of claim 1.

4. The optoelectronic device of claim 1, wherein the transmitter comprises a laser diode.

5. The optoelectronic device of claim 1, wherein the marks are detectable within a predetermined depth of field, and the transmitted light beams have a diameter within the depth of field to a maximum of 660 $\mu$m.

6. The optoelectromc device of claim 1, wherein the guiding means comprises a deflection unit by which the transmitted light beams are periodically guided to inside a scanning range.

7. The optoelectronic device of claim 6, wherein the deflection unit has a rotating polygonal mirror wheel having mirror faces for reflecting the transmitted light beams and received light beams, respectively.

8. The optoelectronic device of claim 7, wherein the polygonal mirror wheel has a structural size adapted to a diameter of the receiving lens.

9. The optoelectronic device of claim 8, further including a housing whose dimensions are adapted to the size of the polygonal mirror wheel and to the diameter of the receiving lens.

* * * * *